April 25, 1972  H. HOFFMANN ET AL  3,658,728
PROCESS FOR PREPARING MOLDINGS FROM POLYEPOXIDES AND POLYAMINES
Filed July 10, 1969
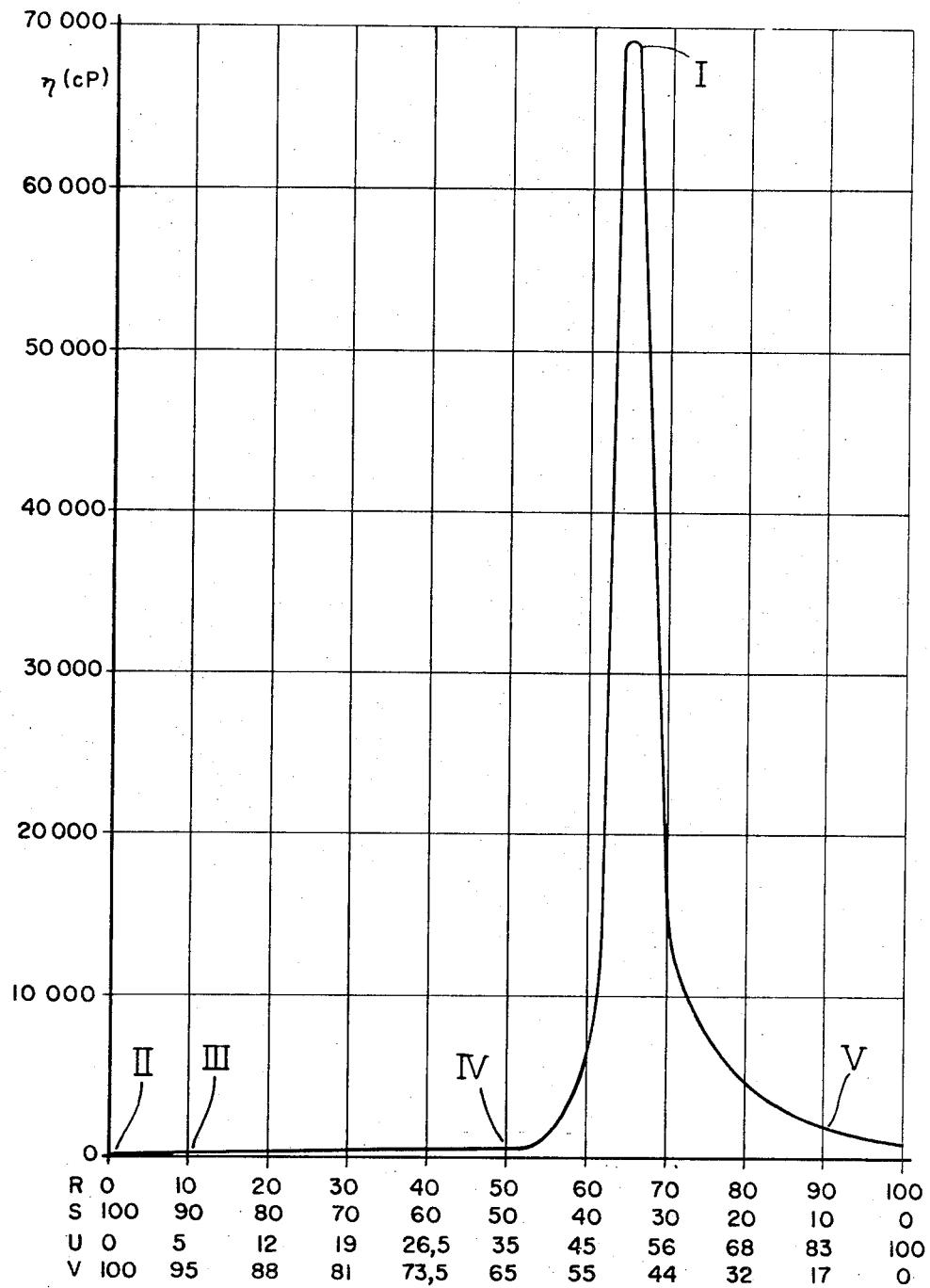
INVENTORS:
HERWIG HOFFMANN
OSKAR LISSNER
KARL MERKEL
HEINRICH SCHOLZ

United States Patent Office 3,658,728
Patented Apr. 25, 1972

3,658,728
PROCESS FOR PREPARING MOLDINGS FROM POLYEPOXIDES AND POLYAMINES
Herwig Hoffmann, Frankenthal, and Oskar Lissner, Karl Merkel, and Heinrich Scholz, Ludwigshafen, Germany, assignors to Badische Anilin- & Soda-Fabrik Aktiengesellschaft, Ludwigshafen (Rhine), Germany
Filed July 10, 1969, Ser. No. 840,721
Claims priority, application Germany, July 10, 1968, P 17 70 832.6
Int. Cl. C08g 30/14
U.S. Cl. 260—2 N        4 Claims

ABSTRACT OF THE DISCLOSURE

Production of moldings and coatings from a polyepoxide and a curing agent comprising a liquid polyamine/alkylphenol adduct having a molar ratio of amino groups to phenolic hydroxy groups of about 1:1.

---

This invention relates to a process for the production of elastic moldings and coatings from reactive mixtures based on polyepoxides and polyamines in the presence of alkylphenols.

It is known that polyepoxides can be reacted with polyamines for the production of infusible and insoluble moldings and coatings, but it has hitherto not been possible to obtain clear, waterproof and elastic cured products by reaction of low molecular weight pourable polyepoxide compounds with equivalent amounts of polyamines or polyamidoamines at room temperature.

Aliphatic polyamines or polyamidoamines in combination with low molecular weight liquid polyepoxides give reaction mixtures which have a short pot life and, when applied as a thin layer, cure very slowly. The resultant coatings are cloudy and brittle, exhibit very poor flow and low resistance to water. When cycloaliphatic polyamines are used, clear cured products are obtained from appropriate mixtures, but the moldings and coatings obtained are also brittle and sensitive to water. Moreover, at low temperatures, for example at day temperatures of from 0° to 10° C. such as occur in winter, the rate of curing is much too slow.

Aromatic polyamines are usually solid at room temperature and are therefore unsuitable for the production of solvent-free reaction mixtures based on low molecular weight liquid polyepoxides. Moldings and coatings prepared from these reaction mixtures usually have to be heated to temperature of more than 60° C. in order to cause the mixture to react and cure satisfactorily. To improve the flow and cure of these mixtures it has been recommended that amounts of up to 10% of phenol, with reference to the epoxy compound used, should be added, but the brittleness and sensitivity to water of the cured products is not appreciably improved by this measure.

We have now found that moldings and coatings can be rapidly prepared in the presence or complete absence of solvent even at temperatures below 20° C. without the said disadvantages by the reaction of a polyepoxide with a polyamino compound having at least two primary and/or secondary amino groups in the presence of an alkylphenol and in the presence or absence of conventional additives by reacting a polyepoxide which is liquid at the processing temperature with a liquid mixture of a polyamino compound and a liquid alkylphenol in which the molar ratio of primary and/or secondary amino groups to hydroxy groups in the alkylphenol is from 0.8:1 to 1.2:1, particularly from 0.9:1 to 1.1:1.

Mixtures of polyamino compounds and alkylphenols having a substantially lower or higher molar ratio surprisingly do not have the advantageous properties for the formation of outstanding moldings or coatings. In particular results which differ only insignificantly from those which can be achieved with mixtures devoid of phenol are obtained with mixtures which contain catalytic amounts of alkylphenol in accordance with the state of the art.

Completely clear moldings and pourable sealing compounds as well as coatings having good elasticity, high resistance to water and a smooth surface free from craters are obtained by the process according to this invention. Although it is possible to use a solvent or diluent, it is not necessary to do so because the curing components of the reaction mixture, which are in liquid condition, can easily be stirred into the liquid polyepoxide. Application is also possible with appropriate two-fluid spray guns and often very advantageous because the limited pot life of the reaction mixture is not exceeded.

All products which are liquid at the processing temperature and which contain more than one epoxy group in the molecule are suitable as polyepoxides. They are preferably low molecular weight polyglycidyl ethers which can be obtained in a conventional manner by reaction of polyphenols, particularly bisphenols, or polyalcohols such as glycerol, pentaerythritol or butanediol-1,4, with epichlorohydrin. Other suitable compounds are polyglycidyl esters and liquid polyepoxides which are obtainable from low molecular weight unsaturated hydrocarbons and hydroperoxides.

Examples of suitable polyepoxides which preferably have a molecular weight of less than 600 are the diglycidyl ethers of 2,2-bis-(p-hydroxyphenyl)-propane and the polyglycidyl ethers of pentaerythritol, glycerol, propylene glycol or butylene glycol. The said polyepoxides may be used alone or mixed with each other or together with small amounts of monoepoxy compounds.

The polyamino compounds for mixing with alkylphenols may be lower molecular weight aliphatic, cycloaliphatic, aromatic or heterocyclic polyamino compounds having at least two primary, two secondary or one primary and one secondary amino groups, which form a liquid mixture together with the alkylphenols in the specified amounts. The polyamines may also contain tertiary nitrogen atoms and hydroxyl groups. Particularly favorable results are achieved with cycloaliphatic polyamines, such as diaminocyclohexanes, 4,4'-diaminodicyclohexylmethane, 2,2-bis-(4-aminodicyclohexyl)-propane, bis-(4-amino-3-methylcyclohexyl) - methane, 1-amino-3-aminomethyl-3,5-trimethylcyclohexane or 1-amino-2-aminomethylcyclopentane. Heterocyclic polyamino compounds, such as diaminoimidazole, di-(N,N'-aminopropyl)-piperazine, N-aminopropylpiperazine, as well as aliphatic polyamines, such as diethylenetriamine, hexamethylenediamine. C-alkyl substituted alkylenediamines, such as trimethyl-hexamethylenediamine and N-($\gamma$-aminopropyl)-2-ethylhexylamine, are also very suitable.

All liquid alkylphenols, such as butylphenol, nonylphenol, nonylisobutylphenol, nonyl-n-butylphenol, dinonylphenol, diisobutylphenol, dodecylphenol and mixtures of these alkylphenols are suitable as alkylphenols. Phenols (hydroxybenzenes) bearing as substituents one or two $C_4$ to $C_{12}$ alkyl groups, particularly one $C_7$ to $C_{12}$ alkyl group, are very suitable; of these p-nonylphenol has proved to be particularly suitable. The alkylphenols are mixed with the polyamino compounds in such a ratio (prior to being added to the polyepoxides) that for each hydroxyl group of the alkylphenol there are from 0.8 to 1.2, particularly from 0.9 to 1.1, primary or secondary amino groups of the polyamino compound. Alkylphenols and polyamino compounds are preferably mixed in an equivalent ratio of hydroxy groups and primary or secondary amino groups. The resultant liquid mixture may be stored in this form and added to the polyepoxide for the purpose of reaction when required. Mixtures of different polyamine-alkylphenol adducts may be used with special advantage, and a decrease in the viscosity can be achieved in this way.

The mixture of polyamino compound and alkylphenol used according to this invention is preferably stirred intimately (prior to processing) in an approximately equivalent ratio with the polyepoxide, i.e. in a ratio in which there is at least one amino hydrogen atom for each epoxy group.

It is easy to determine whether the mixture of polyamino compound and alkylphenol according to this invention is present in the correct molar ratio. If a mixing series of a polyamine with an alkylphenol is plotted against viscosity as shown in the drawing (R=percent by weight nonylphenol; S=percent by weight amine; U=mole percent phenolic hydroxyl; V=mole percent amino nitrogen; $\eta$=viscosity in cp.), it is found that in the mixing range in accordance with this invention, the viscosity of the mixture rises suddenly. Solvent-free mixtures according to the invention accordingly have viscosities of about 100 centipoises or less. The skilled worker will therefore in fact be able to obtain the correct mixing ratio by merely stirring the mixture together and without analytical assistance.

The reaction mixture may contain in addition a solvent or plasticizer, particularly in an amount of less than 15% by weight with reference to the amount of polyamine-alkylphenol mixture, as well as conventional inert fillers pigment dyes, soluble dyes or other conventional auxiliaries. The reaction mixture may also have mixed with it a small amount of another conventional hardener for the reaction with the polyepoxides. They are however particularly suitable for the production of solvent-free moldings and coatings.

The moldings, pourable sealing compounds and coatings prepared by reaction of the reaction mixture are particularly elastic and impact resistant. They are distinguished by high clarity, a smooth surface, good resistance to aging and good resistance to water, salts, alkalies and acids. Since reaction of the polyamine-alkylphenol mixtures with the polyepoxides in accordance with this invention also takes place rapidly at temperatures of from 0° to 20° C., heating of the reaction mixture, which is often not easy to carry out, may be dispensed with.

The invention is illustrated by the following examples. The criteria of quality used in the following examples are determined as described below:

The value known as the Erichsen value for elasticity (test B) is determined on a coating applied to deep-drawing sheet metal by forcing a steel ball having a diameter of 15 mm. into the sheet metal from the rear thereof and the depth of penetration is measured at which the coating begins to crack. An Erichsen value of from 0 to 1.5 mm. is given the rating 6 (inadequate) and an Erichsen value of more than 10 mm. the rating 1 (very good).

König's pendulum hardness is determined on deep-drawing shet metal coated in the same way by means of pendulum hardness testing equipment in accordance with DIN 53,157 (test D). A pendulum hardness of less than 20 seconds is given the rating 6 (inadequate) and a pendulum hardness of more then 150 seconds the rating 1 (very good).

Another series of tests is carried out on coatings on sheets of glass:

Test A: Measurement of the drying time by means of an automatic sanding apparatus, namely: $A^1$ at 20° C. until devoid of tackiness; $A^2$ at 20° C. until completely dry all the way through; and $A^3$ at 0°.

Test C: Storage in water for twenty-four hours at 20° C. The ratings range from 1 (very good; no change) to 6 (inadequate; marked cloudiness and formation of bubbles).

Test E: Uniformity of application. Subjective evaluation of 1 (very good; completely clear coating) to 6 (marked craters, cloudiness, bubbles and other flow defects).

The parts and percentages given in the following examples are by weight unless stated otherwise.

EXAMPLE 1

77.4 parts of a mixture of 28% (33.33 mole percent) of 3 - aminomethyl - 3,5,5-trimethylcyclohexylamine (H-active equivalent weight: 43) and 72% (66.66 mole percent) of p-nonylphenol (molecular weight 220) are stirred into 100 parts of a liquid reaction product of 2,2-bis-(p-hydroxyphenyl) - propane with epichlorohydrin (epoxy value 0.5). The resultant reaction mixture is applied in a thin layer to sheets of glass and to iron sheets. Completely clear coatings are obtained which are tack-free after 3.5 hours and cured all the way through after 7.5 hours at 20° C. and 65% relative humidity. The pendulum hardness of the coatings after a drying time of twenty-four hours is 126 seconds (rating 2), the Erichsen value 7.1 to 8.0 (rating 2). The coatings remain elastic and resistant to flexure even after having been aged for fifteen hours at 60° C. Films dried for two days at room temperature and for fifteen hours at 60° C. do not exhibit any cloudiness or other disadvantageous change (rating 1) after having been immersed in distilled water.

Comparative experiment 1

Coatings are prepared on sheet steel from a reaction mixture of 100 parts of the polyepoxide used in Example 1 and 21.6 parts of the polyamino compound specified in Example 1 in the manner described in Example 1 but without using an alkylphenol. The coatings are not entirely tack-free after having been stored for three days at room temperature. The resultant coatings are brittle (Erichsen value 0.2 (rating 6)) and very sensitive to water (rating 5). No improvement in the coating's elasticity and resistance to water is achieved by after curing for fifteen hours at 60° C.

EXAMPLE 2

108 parts of a mixture of 36% (33.33 mole percent) of bis - (4 - amino - 3-methylcyclohexyl)-methane and 64% (66.66 mole percent) of p-nonylphenol is stirred into 100 parts of a liquid reaction product of pentaerythritol and epichlorohydrin having an epoxy value of 0.62 and a viscosity according to DIN (Deusche Industrie-Norm) 4–53211 (efflux time in Ford beaker) of 200 seconds. The ratio of amino groups to phenolic groups is 1:1. After the reaction mixture has been applied to sheets of glass and metal sheets in a thin layer, coatings are obtained which flow well and which are tack-free after five hours and cured all the way through after ten hours at 20° C. and 65% relative humidity. The coatings dry well even at 0° C. after one day. After an additional aging period of fifteen hours at 60° C. the coatings have good elasticity and flexural strength (Erichsen value 7.0: rating 2.5).

Comparative experiment 2a

Under the conditions according to Example 2 but using a reaction mixture of 100 parts of the polyepoxide specified in Example 1 and 38 parts of bis-(4-amino-3-methylcyclohexyl)-methane (ratio II in drawing), coatings are obtained which are not tack-free even after three days at 0° C. Coatings hardened for fifteen hours at 60° C. are very brittle (Erichsen value 2.3).

Comparative experiment 2b

The procedure of Example 2 is followed but 66 parts of a hardener mixture of 90% by weight (89.2 mole percent) of the amine used therein and 10% by weight (10.8 mole percent) of nonylphenol is used per 100 parts of epoxide. The ratio of amino groups in the hardener mixture is 16.5:1 (ratio III in drawing).

Comparative experiment 2c 78 parts of a mixture of equal parts by weight of the amine and phenol used in Example 2 (equivalent to a molar ratio of 48:52 or a ratio of amino groups to phenolic groups of 2:1, ratio IV in drawing) is used to cure the epoxide.

Comparative experiment 2d 385 parts of a mixture of 90% by weight of nonylphenol and 10% by weight of the amine according to Example 2 (equivalent to a molar ratio of 91:9 or a ratio of amino groups to phenolic groups of 0.2:1 (ratio V in drawing)) per 100 parts of epoxide.

The results are tabulated below, the following abbreviations being used in the table:

T=total evaluation.
nm=not measurable.
nc=no serviceable coating obtained.
Ex.=Example.
Tests A1, A2 and A3 given in hours.
Tests B, C, D and E given in ratings 1–6.

TABLE

| Test | Ex. 2 | Comparative experiments | | | |
|---|---|---|---|---|---|
| | | 2a | 2b | 2c | 2d |
| A1 | 5 | 8 | 6 | 6 | nc |
| A2 | 10 | 24 | 19 | 10 | nc |
| A3 | 24 | 72 | 72 | 48 | nc |
| B | 2–3 | 5 | 4–5 | 4–5 | nc |
| C | 1 | 5 | 4–5 | 1 | nc |
| D | 1–2 | nm | 1 | 1–2 | nc |
| E | 1 | 4 | 4 | 2 | nc |
| T | 1–2 | 5 | 4–5 | 3 | ns |

EXAMPLE 3

95 parts of a mixture of 33 parts of bis-(4-amino-3-methylcyclohexyl)methane and 67 parts of p-nonylphenol (equivalent to a ratio of amine groups to phenolic groups of 0.92:1) is stirred into 100 parts of a liquid polyepoxide having an epoxy value of 0.5 and obtained by reaction of 2,2-bis-(p-hydroxyphenyl)-propane with epichlorohydrin. The resultant coatings are tack-free after four hours at 20° C. and cured all the way through after 6.5 hours. After the coatings have been aged at 60° C. for fifteen hours, they are highly elastic and have good flexural strength. The Erichsen value is 7.0 (rating 2.5) and the pendulum hardness is 140 seconds. After the coatings have been immersed for twenty-four hours in distilled water, no change whatever in them can be detected. The coatings are completely resistant to the action of 10% hydrochloric acid or 10% caustic soda solution in a 45-day test.

When the degree of drying of coatings prepared from the reaction mixture at 0° C. is tested, it is found that they have a tack-free surface after only one day.

Comparative experiment 3

The procedure of Example 3 is followed but the addition of alkylphenol is omitted. Coatings are obtained which are brittle and sensitive to water after having been dried at room temperature. When the reaction mixture is applied in a thin layer to sheets of glass and to metal sheets, it remains tacky even after several days at a temperature of 0° C.

EXAMPLE 4

100 parts of a polyepoxide having an epoxy value of 0.5 and prepared from 2,2-bis-(p-hydroxyphenyl)-propane and epichlorohydrin is intimately mixed with 81 parts of a mixture of 32% of butyleneglycol-1,4-bis-(diaminopropyl)-ether and 68% of p-nonylphenol (equivalent to a molar ratio of amino groups to phenolic groups of 0.96:1) and the reaction mixture is applied in a thin layer to sheets of glass and to metal sheets. Clear glossy coatings which flow well and are free from streaks are obtained; they are tack-free after three hours and cured all the way through after seven hours. The films are highly elastic (Erichsen value 10.2) and, when heated for fifteen hours at 60 C., have good flexural strength (Erichsen value 9.9). Coatings dried at room temperature are completely resistant to the action of water and 10% hydrochloric acid in a 45-day test. The reaction mixture gives stable and elastic moldings when cast in molds.

Comparative experiment 4

Moldings and coatings are prepared in accordance with the procedure of Example 4 from a reaction mixture of 100 parts of the said polyepoxide and 26 parts of butyleneglycol-1,4-bis-($\gamma$-aminopropyl)-ether without the addition of alkylphenol. These are still tacky and cloudy after having been kept for two days at room temperature and after having been heated for fifteen hours at 60° C.

EXAMPLE 5

100 parts of a liquid polyepoxide prepared from 2,2-bis-(p-hydroxyphenyl)-propane and epichlorohydrin and having an epoxy value of 0.5 is intimately mixed with 96.3 parts of a mixture of 27% of butyleneglycol-1,4-bis-($\gamma$-aminopropyl)-ether and 73% of p-nonylisobutylphenol and applied in a thin layer to steel sheets. The coatings are tack-free after 4.5 hours and cured all the way through after ten hours. They are clear, hard (pendulum hardness after twenty-four hours 112 seconds), elastic (Erichsen value 10.7) and resistant to water.

EXAMPLE 6

69.2 parts of a mixture of 21% of 1-amino-2-aminomethyl-cyclopentane and 79% of p-nonylphenol is stirred into 100 parts of a liquid polyepoxide having an epoxy value of 0.5 which has been prepared from 2,2-bis-(p-hydroxyphenyl)-propane and epichlorohydrin and the reaction mixture is poured into molds or applied in a thin layer to sheets of glass and metal sheets. The resultant moldings and coatings are tack-free after four hours and cured all the way through after seven hours. The pendulum hardness of the coatings after storage for two hours at room temperature is 119 seconds and after aging for fifteen hours at 60° C. 114 seconds. The Erichsen value prior to aging is 10.3. The moldings are also highly elastic. After the moldings and coatings have been immersed in distilled water for two days, no attack on them can be detected.

Comparative experiment 6

The procedure described in Example 6 is followed but without using an alkylphenol. Under the same conditions brittle moldings and coatings having high sensitivity to water are obtained. Moldings and coatings which are brittle and sensitive to water are also obtained when equivalent mixtures of 30% of 1-amino-2-aminomethylcyclopentane and 70% of p-nonylphenol are used as the curing component for the polyepoxide.

EXAMPLE 7

100 parts of a liquid polyepoxide having an epoxy value of 0.5 and prepared from 2,2-bis(p-hydroxyphenyl)-propane and epichlorohydrin is intimately mixed with 80.4 parts of a mixture of 25% of hexamethylenediamine bearing three methyl substituents on the carbon atoms and 75% of p-nonylphenol (molar ratio of $NH_2$ to OH=1:1) and the reaction mixture is poured into molds or applied in a thin layer to sheets of glass or metal sheets. The resultant coatings are tack-free after 2.5 hours at 20° C. and cured all the way through after 4.5 hours. They are elastic (Erichsen value 8.8) but hard and scratch resistant (pendulum hardness 150 seconds). The moldings and coatings are moreover outstandingly resistant to water.

Comparative experiment 7

The reaction mixture of Example 7 without p-nonylphenol is used for the preparation of moldings and coatings according to Example 7. Moldings and coatings are obtained at room temperature which are very tacky and sensitive to water after three days.

EXAMPLE 8

100 parts of a liquid polyepoxide having an epoxy value of 0.62 and prepared by reaction of pentaerythritol and epichlorohydrin is intimately mixed with 108.7 parts of a mixture of 35% of bis-(4-amino-3-methylcyclohexyl)-methane and 65% of p-nonylphenol. Moldings are prepared from the reaction mixture by pouring it into molds and coatings are prepared by applying it to steel sheets in a thin layer. The resultant moldings and coatings are hard and even after heating for fifteen hours at 60° C. are still highly elastic (Erichsen value 9.1).

Comparative experiment 8

The procedure of Example 8 is followed exactly except that no p-nonylphenol is used. Brittle moldings and coatings are obtained which after having been heated at 60° C. for fifteen hours have an Erichsen value of 2.0 (instead of 9.1).

We claim:

1. In a process for the production of moldings and coatings by the reaction of a poly(1,2-)epoxide with a polyamino compound having at least two primary or secondary amino groups in the presence of an alkylphenol, the improvement which comprises: reacting a liquid poly(1,2-)epoxide with a liquid mixture of a polyamino compound selected from the group consisting of cycloaliphatic, aromatic and heterocyclic polyamino compounds and a liquid alkylphenol bearing one or two $C_4$ to $C_{12}$ alkyl groups as the sole substituents in which the molar ratio of primary and secondary amino groups to hydroxyl groups in the alkylphenol is from 0.9:1 to 1.1:1.

2. A process as claimed in claim 1 wherein the ratio of poly(1,2-)epoxide to the mixture of polyamino compound and alkylphenol in the reaction mixture is such that there is at least one amino hydrogen atom in the polyamino compound for each epoxy group of the polyepoxide.

3. A process as claimed in claim 1, wherein said polyamino compound is selected from the group consisting of diaminocyclohexanes, 4,4'-diaminodicyclohexylmethane, 2,2-bis-(4-aminodicyclohexyl)-propane, bis-(4 - amino-3-methylcyclohexyl)-methane, 1-amino-3-aminomethyl-3,5-trimethylcyclohexane and 1-amino-2-aminomethylcyclopentane.

4. A process as claimed in claim 1, wherein said polyamino compound is selected from the group consisting of diaminoimidazole, di-(N,N'-aminopropyl)-piperazine, and N-aminopropylpiperazine.

References Cited

UNITED STATES PATENTS 3,366,600  1/1968  Haberlinn et al. __ 260—47 Ep X
3,428,601  2/1969  Dijkstra et al. __ 260—2 Ep C X WILLIAM H. SHORT, Primary Examiner U.S. Cl. X.R.

260—47 EN, 830 TW

PO-1050
(5/69)

UNITED STATES PATENT OFFICE
CERTIFICATE OF CORRECTION

Patent No. 3,658,728                    Dated April 25, 1972

Inventor(s) Herwig Hoffmann et al

It is certified that error appears in the above-identified patent and that said Letters Patent are hereby corrected as shown below:

Column 3, line 59, "shet" should read -- sheet --.

Column 4, line 47, "Deusche" should read -- Deutsche --.

Column 6, line 41, "114" should read -- 144 --.

Signed and sealed this 5th day of September 1972.

(SEAL)
Attest:

EDWARD M.FLETCHER,JR.                   ROBERT GOTTSCHALK
Attesting Officer                       Commissioner of Patents